(12) United States Patent
Mirmohammadi Ghoojdi

(10) Patent No.: US 11,873,737 B1
(45) Date of Patent: Jan. 16, 2024

(54) FLOW DEFLECTOR FOR APERTURE IN GAS TURBINE ENGINE FLOWPATH WALL

(71) Applicant: Pratt & Whitney Canada Corp., Longueuil (CA)

(72) Inventor: Tahereh Mirmohammadi Ghoojdi, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/871,582

(22) Filed: Jul. 22, 2022

(51) Int. Cl.
| | |
|---|---|
| *F01D 9/02* | (2006.01) |
| *F01D 5/14* | (2006.01) |
| *F04D 29/68* | (2006.01) |
| *F01D 25/14* | (2006.01) |
| *F04D 27/02* | (2006.01) |
| *F04D 29/18* | (2006.01) |
| *F01D 1/02* | (2006.01) |

(52) U.S. Cl.
CPC .............. *F01D 9/02* (2013.01); *F01D 1/023* (2013.01); *F01D 5/143* (2013.01); *F01D 5/145* (2013.01); *F01D 25/14* (2013.01); *F04D 27/023* (2013.01); *F04D 27/0215* (2013.01); *F04D 29/18* (2013.01); *F04D 29/68* (2013.01); *F05D 2220/32* (2013.01); *F05D 2240/12* (2013.01); *F05D 2260/60* (2013.01)

(58) Field of Classification Search
CPC . F01D 9/02; F01D 1/023; F01D 5/143; F01D 5/145; F01D 25/14; F04D 27/0215; F04D 27/023; F04D 29/18; F04D 29/68; F05D 2220/32; F05D 2240/12; F05D 2260/60
See application file for complete search history.

(56) References Cited

U.S. PATENT DOCUMENTS

| | | | | |
|---|---|---|---|---|
| 5,340,054 A | * | 8/1994 | Smith | B64C 23/06 244/1 N |
| 5,791,138 A | * | 8/1998 | Lillibridge | F02K 1/386 60/262 |
| 7,798,448 B2 | * | 9/2010 | Bilanin | B64C 23/005 244/130 |
| 7,966,831 B2 | | 6/2011 | Kraft | |
| 8,292,567 B2 | * | 10/2012 | Damle | F01D 9/041 415/144 |
| 10,518,605 B2 | | 12/2019 | Molin | |
| 11,162,417 B2 | | 11/2021 | Qiu | |
| 11,230,935 B2 | * | 1/2022 | Huizenga | F01D 5/189 |
| 2017/0335771 A1 | * | 11/2017 | Post | F02C 3/04 |
| 2018/0016017 A1 | * | 1/2018 | daSilva | F04F 5/20 |
| 2019/0169990 A1 | * | 6/2019 | Chaboud | F01D 5/066 |
| 2019/0360398 A1 | * | 11/2019 | Qiu | F02C 7/14 |
| 2020/0018208 A1 | | 1/2020 | Prevot | |

* cited by examiner

Primary Examiner — Brian Christopher Delrue

(74) Attorney, Agent, or Firm — Getz Balich LLC

(57) ABSTRACT

A system is provided for a gas turbine engine. This gas turbine engine system includes a flowpath wall and a deflector. The flowpath wall includes a surface and an opening to a blind aperture. The surface forms a peripheral boundary of an internal engine flowpath. The opening is disposed in the surface. The blind aperture extends vertically into the flowpath wall from the opening. The deflector projects vertically out from the flowpath wall into the internal engine flowpath. The deflector is configured to deflect gas flowing within the internal engine flowpath over the opening.

13 Claims, 6 Drawing Sheets

FLOW DEFLECTOR FOR APERTURE IN GAS TURBINE ENGINE FLOWPATH WALL

TECHNICAL FIELD

This disclosure relates generally to a gas turbine engine and, more particularly, to a flow deflector for the gas turbine engine.

BACKGROUND INFORMATION

A gas turbine engine may include a flow deflector within a flowpath to deflect gas flow downstream of the flow deflector. Various types and configurations of flow deflectors are known in the art. While these known flow deflectors have various advantages and applications, there is still room in the art for improvement.

SUMMARY

According to an aspect of the present disclosure, a system is provided for a gas turbine engine. This gas turbine engine system includes a flowpath wall and a deflector. The flowpath wall includes a surface and an opening to a blind aperture. The surface forms a peripheral boundary of an internal engine flowpath. The opening is disposed in the surface. The blind aperture extends vertically into the flowpath wall from the opening. The deflector projects vertically out from the flowpath wall into the internal engine flowpath. The deflector is configured to deflect gas flowing within the internal engine flowpath over the opening.

According to another aspect of the present disclosure, another system is provided for a gas turbine engine. This gas turbine engine system includes a flowpath wall and a deflector. The flowpath wall includes a surface and an opening to a blind aperture. The surface forms a peripheral boundary of an internal engine flowpath. The opening is disposed in the surface. The blind aperture extends vertically into the flowpath wall from the opening. The deflector projects vertically out from the flowpath wall into the internal engine flowpath. The deflector is configured to deflect gas flowing within the internal engine flowpath around the opening.

According to still another aspect of the present disclosure, another system is provided for a gas turbine engine. This gas turbine engine system includes a flowpath wall and a deflector. The flowpath wall includes a surface and an opening to a fastener aperture. The surface forms a peripheral boundary of an internal engine flowpath. The opening is disposed in the surface. The fastener aperture extends vertically into the flowpath wall from the opening. The deflector extends longitudinally between a leading edge and a trailing edge. The deflector extends laterally between a first side and a second side. The deflector vertically tapers to the surface as the deflector extends longitudinally to the leading edge. The deflector also vertically tapers as the deflector extends laterally to the first side and to the second side. The trailing edge extends along a portion of the opening.

The deflector may be configured to deflect gas flowing within the internal engine flowpath over and/or around the opening.

The deflector may be disposed upstream of the opening.

The deflector may be disposed adjacent the opening.

The deflector may extend laterally along an upstream edge of the opening.

The opening may have a lateral opening width. The deflector may have a lateral deflector width that is equal to or greater than the lateral opening width.

The deflector may have a lateral width and a vertical height. A ratio between the lateral width and the vertical height may be between 1 and 5.

The deflector may be configured as or otherwise include a ramp.

The deflector may extend longitudinally between a leading edge and a trailing edge. The deflector may vertically taper to the surface as the deflector extends longitudinally to the leading edge.

The trailing edge may have a curved geometry.

The deflector may extend laterally between a first side and a second side. The deflector may vertically taper to the surface as the deflector extends laterally to the first side.

The deflector may also vertically taper to the surface as the deflector extends laterally to the second side.

The system may also include a fastener. The fastener may include a head. The head may be disposed within the blind aperture.

The head may be recessed vertically into the blind aperture from the surface.

The system may also include a second deflector. The flowpath wall may also include a second opening to a second blind aperture. The second opening may be disposed in the surface. The second blind aperture may extend vertically into the flowpath wall from the second opening. The second deflector may project vertically out from the flowpath wall into the internal engine flowpath. The second deflector may be configured to deflect the gas flowing within the internal engine flowpath over the second opening.

The system may also include a fitting. The fitting may include the flowpath wall and a takeoff conduit. The flowpath wall may also include a takeoff port downstream of the opening. The takeoff conduit may project vertically out from the flowpath wall. The takeoff conduit may include a takeoff passage fluidly coupled with the internal engine flowpath through the takeoff port.

The system may also include a gas turbine engine core. The internal engine flowpath may be configured as or otherwise include one of: a bypass flowpath that bypass the gas turbine engine core; or a core flowpath that extends within the gas turbine engine core.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
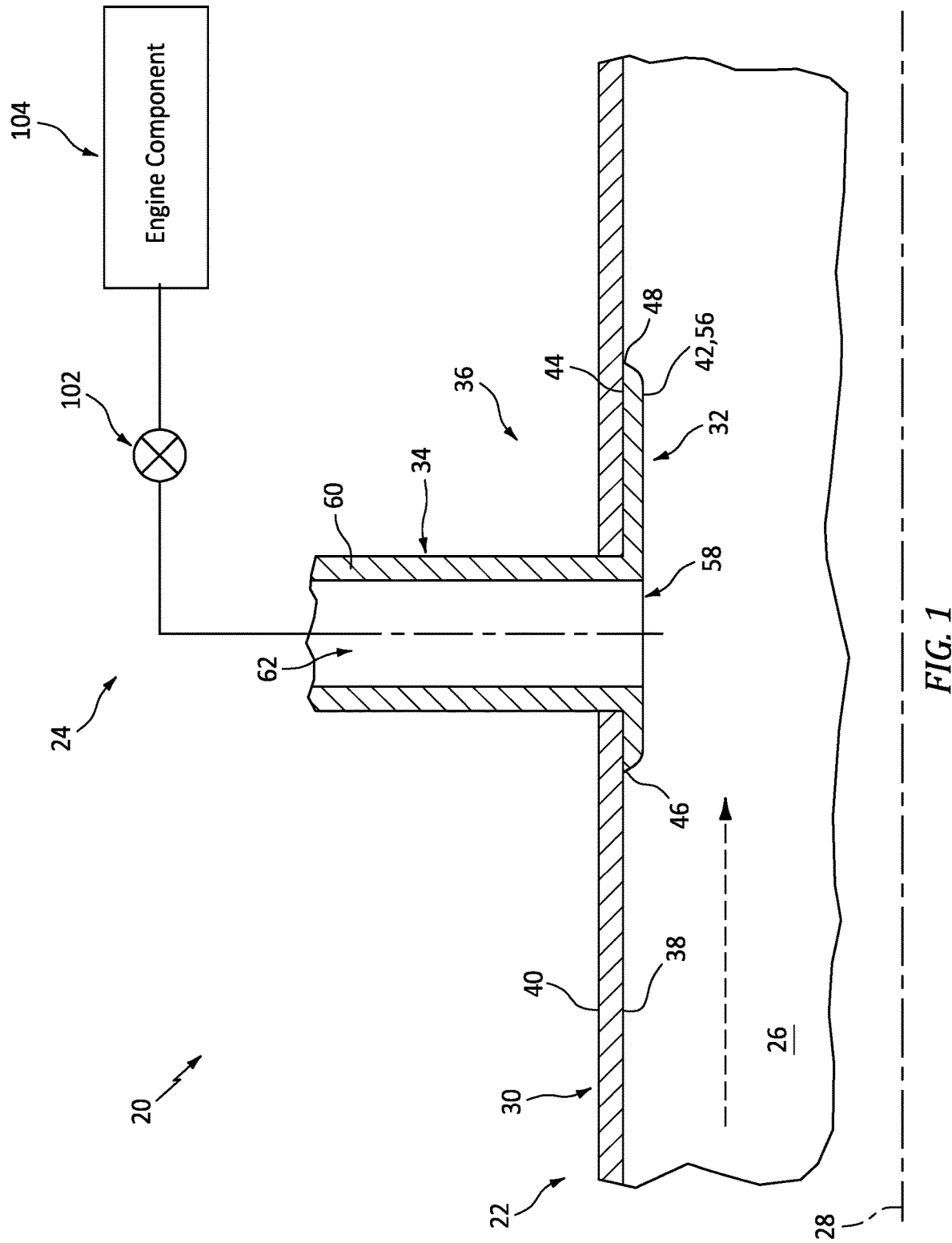
FIG. 1 is a sectional schematic illustration of a system for a gas turbine engine.

FIG. 1 illustrates a system 20 for a gas turbine engine. This engine system 20 may be part of a propulsion system for an aircraft, an auxiliary power unit (APU) for an aircraft, or a power generation system for a non-aircraft application. The engine system 20 of FIG. 1 includes a gas turbine engine structure 22 and a fluid system 24; e.g., a takeoff air system.

The engine structure 22 partially or completely forms an internal engine flowpath 26 within the gas turbine engine. This engine flowpath 26 extends axially along an axial centerline 28 within (e.g., through) the gas turbine engine and its engine structure 22, which axial centerline 28 may also be a rotational axis for one or more rotating structures (e.g., spools) within the gas turbine engine. The engine flowpath 26 may extend circumferentially about (e.g., completely around) the axial centerline 28 providing the engine flowpath 26 with, for example, an annular cross-sectional geometry. Examples of the engine flowpath 26 include, but are not limited to, a bypass flowpath which bypasses a core of the gas turbine engine, and a core flowpath which extends within (e.g., through) the gas turbine engine core.

The engine structure 22 includes one or more flowpath walls 30 and 32 and a takeoff conduit 34 for the fluid system 24. Briefly, the second flowpath wall 32 and the takeoff conduit 34 may collectively form or may otherwise be included as part of a takeoff fitting 36 for the fluid system 24.

The flowpath walls 30 and 32 form a peripheral boundary of the engine flowpath 26 within the gas turbine engine and its engine structure 22. The peripheral boundary of FIG. 1 is an outer peripheral boundary of the engine flowpath 26. The flowpath walls 30 and 32, however, may also or alternatively form an inner peripheral boundary of the engine flowpath 26 and/or a side peripheral boundary of the engine flowpath 26.

The first flowpath wall 30 may be configured as or otherwise include a duct wall, an engine casing, a shroud, a platform and/or a liner. The first flowpath wall 30 extends vertically (e.g., radially relative to the axial centerline 28) between and to an interior side 38 of the first flowpath wall 30 and an exterior side 40 of the first flowpath wall 30. The first flowpath wall 30 may extend circumferentially about (e.g., completely around) the axial centerline 28 providing the first flowpath wall 30 with, for example, a tubular geometry.

Figure 2:
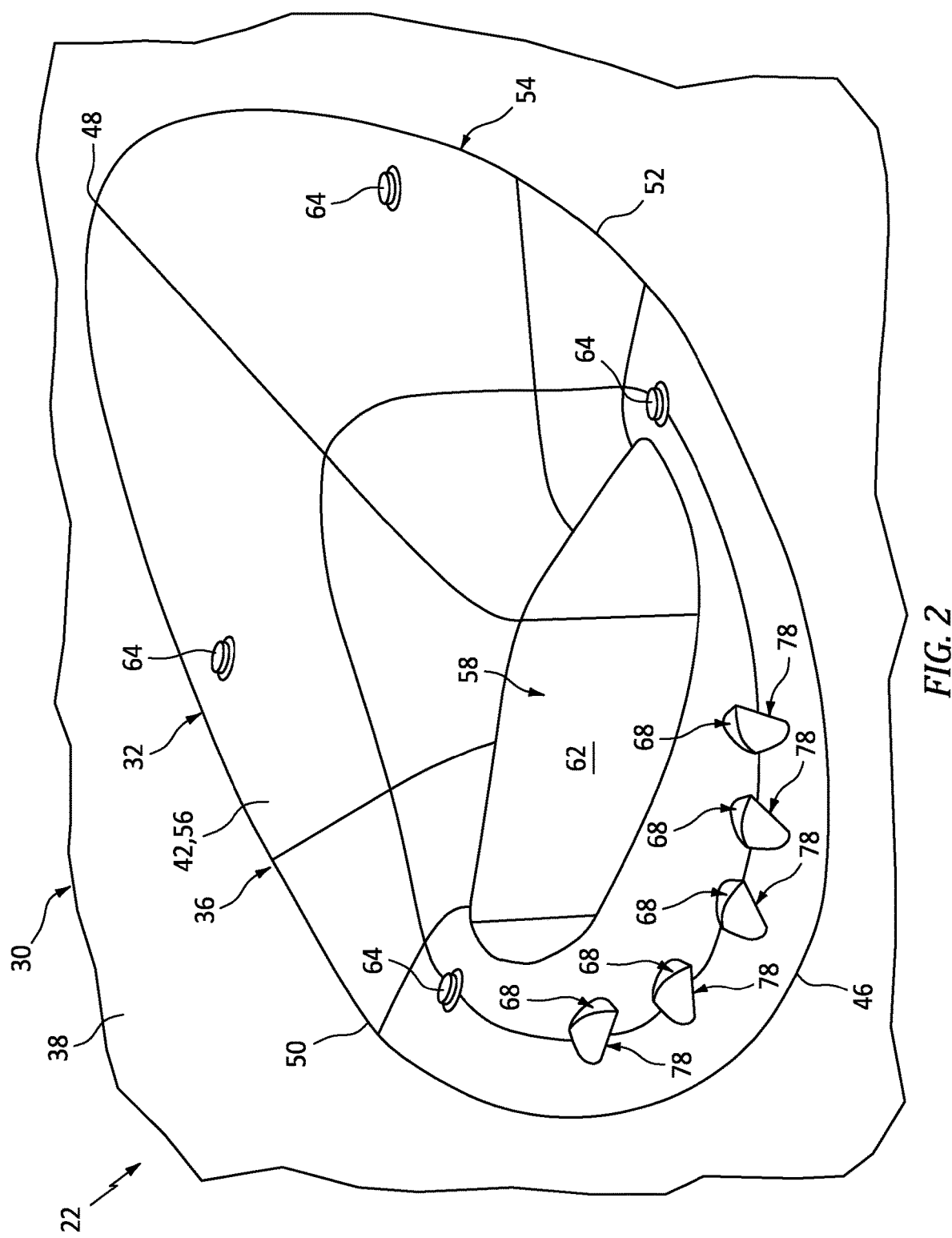
FIG. 2 is a partial perspective illustration of an engine structure with a takeoff fitting.

The second flowpath wall 32 may be configured as or otherwise include a mounting structure for the takeoff fitting 36 such as a mounting plate, a flange and/or a rim. The second flowpath wall 32 extends vertically between and to an interior side 42 of the second flowpath wall 32 and an exterior side 44 of the second flowpath wall 32. Referring to FIG. 2, the second flowpath wall 32 extends axially between and to a leading end 46 of the second flowpath wall 32 and a trailing end 48 of the second flowpath wall 32. The second flowpath wall 32 extend circumferentially between and to a first side 50 of the second flowpath wall 32 and a second side 52 of the second flowpath wall 32. An outer periphery 54 of the second flowpath wall 32 of FIG. 2 has an elongated curvilinear shape; e.g., an egg shape, a teardrop shape or an oval. The second flowpath wall 32 of the present disclosure, however, is not limited to such exemplary outer peripheral shapes.

Referring to FIG. 1, the second flowpath wall 32 includes an interior wall surface 56 at the second wall interior side 42 and a takeoff port 58 such as an air bleed or any other through-hole. The takeoff port 58 is disposed (e.g., intermediately) along an axial length of the engine flowpath 26. The takeoff port 58 is formed in the second flowpath wall 32 and, more particularly, the wall surface 56; see also FIG. 2. The takeoff port 58 is thereby vertically adjacent and fluidly coupled with the engine flowpath 26.

The takeoff conduit 34 has a tubular sidewall 60 that forms an internal conduit passage 62 (e.g., an inner bore) within the takeoff conduit 34. This conduit passage 62 is fluidly coupled with the takeoff port 58. The conduit passage 62 is thereby fluidly coupled with the engine flowpath 26 through the takeoff port 58. The takeoff conduit 34 and its sidewall 60 project (e.g., vertically) out from the second flowpath wall 32. The takeoff conduit 34 and its sidewall 60 may also be formed integral with or otherwise connected (e.g., mechanically fastened, bonded, etc.) to the second flowpath wall 32.

The takeoff fitting 36 and its second flowpath wall 32 are arranged with the first flowpath wall 30. The second flowpath wall 32 of FIGS. 3 and 4, for example, axially and circumferentially overlaps a portion of the first flowpath wall 30, where the second wall exterior side 44 may be vertically abutted against or otherwise engage the first wall interior side 38. The takeoff fitting 36 and its second flowpath wall 32 are mounted to the first flowpath wall 30 with one or more fasteners 64 (e.g., bolts; see also FIG. 2. To reduce flow disruptions to gas flowing within the engine flowpath 26 toward the takeoff port 58 (see FIGS. 1 and 2), a head 66 of one or more of the fasteners 64 may each be countersunk into a blind aperture 68 (e.g., a counterbore) in the takeoff fitting 36. More particularly, each fastener head 66 may be recessed vertically into the respective fastener aperture 68 from the wall surface 56. The term "blind" may describe an aperture that is closed-ended, deadheaded, capped, plugged, etc. Here, the fastener aperture 68 is blind when the fastener head 66 is within the fastener aperture 68 and closes off a bore 69 which receives a shank 70 of the respective fastener 64. The present disclosure, however, is not limited to such an exemplary arrangement.

Figure 3:
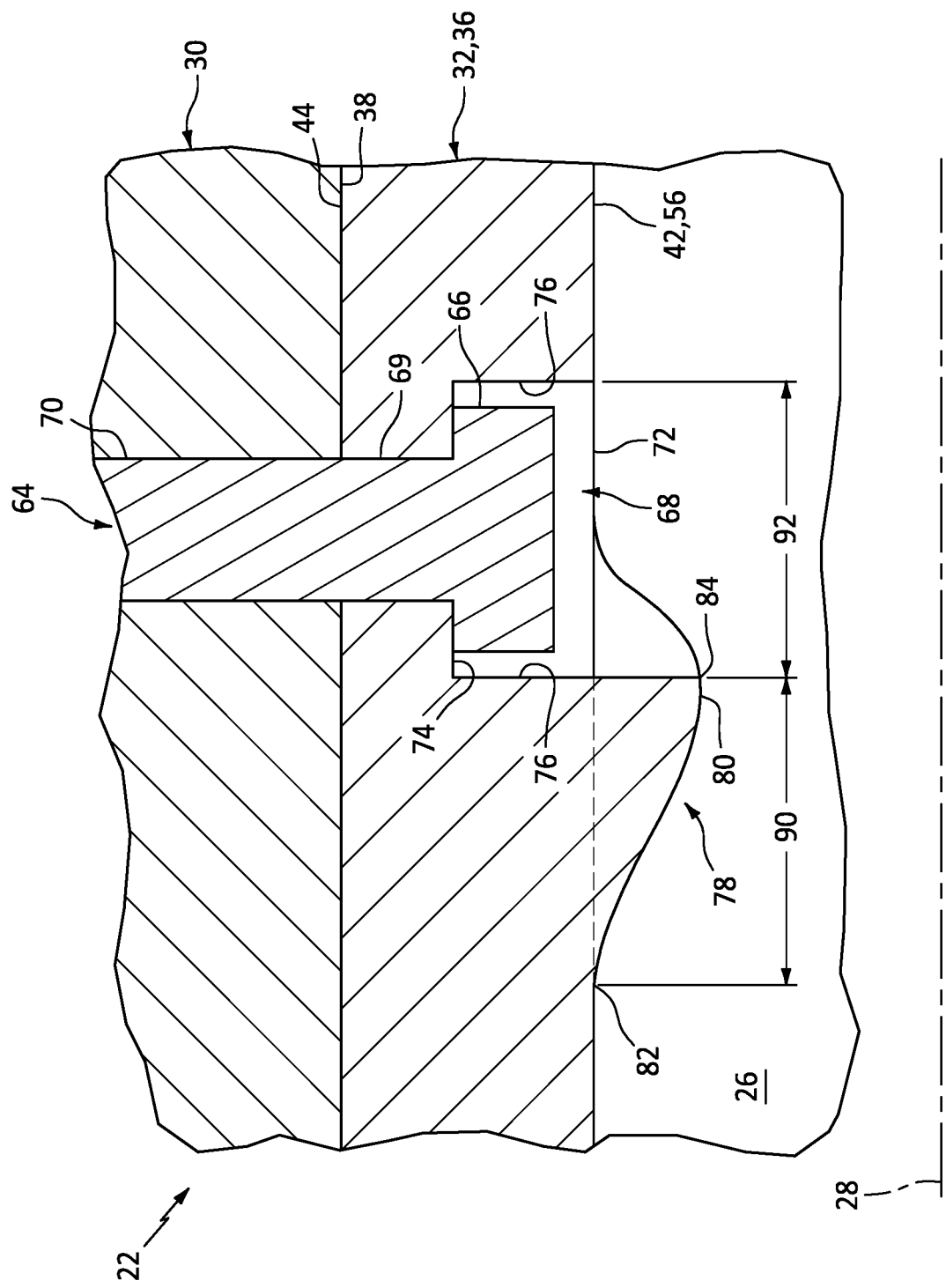
FIG. 3 is a partial sectional illustration of the engine structure at a flow deflector along a first section line.
Figure 4:
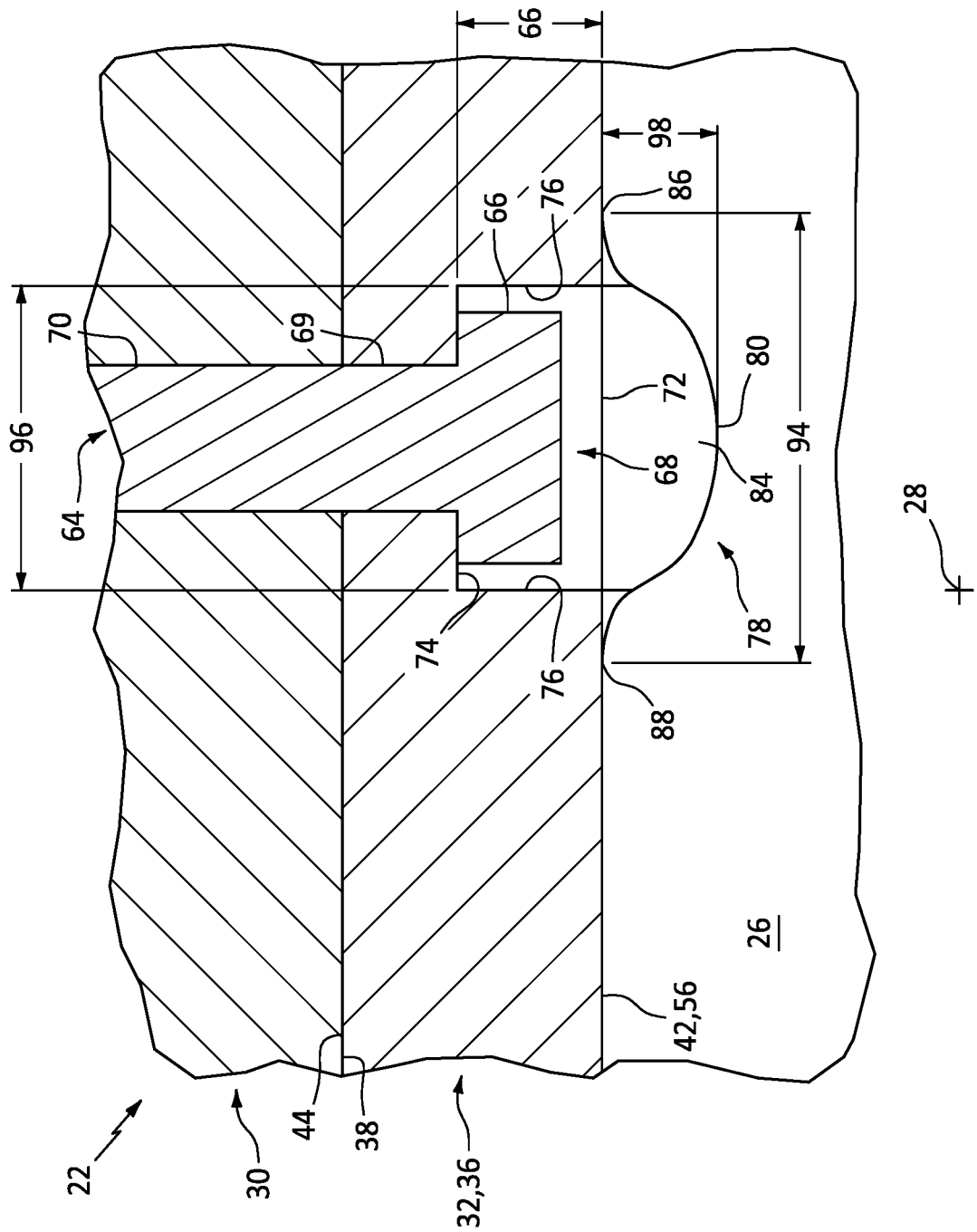
FIG. 4 is a partial sectional illustration of the engine structure at the flow deflector along a second section line perpendicular to the first section line.

Each fastener aperture 68 of FIGS. 3 and 4 projects vertically into the takeoff fitting 36 and its second flowpath wall 32 from an opening 72 of the respective fastener aperture 68 in the wall surface 56 to a (e.g., annular) vertical endwall 74 of the respective fastener aperture 68. Each fastener aperture 68 extends within the takeoff fitting 36 and its second flowpath wall 32 to an outer peripheral sidewall 76 of the respective fastener aperture 68, where this aperture sidewall 76 extends vertically from the wall surface 56 to the aperture endwall 74.

One or more or all of the fastener apertures 68 may each be provided with a flow deflector 78. This flow deflector 78 is configured to deflect the gas, which is flowing within the engine flowpath 26 towards the respective fastener aperture 68, (e.g., completely) over and/or (e.g., completely) around the aperture opening 72. With such an arrangement, little or none of the gas flowing towards the respective fastener aperture 68 may flow through the aperture opening 72 and into the respective fastener aperture 68 during at least one mode of gas turbine engine operation; e.g., when the gas flows within the engine flowpath 26 with more than a certain flowrate. Furthermore, little or none of the gas flowing towards the respective fastener aperture 68 may interact with (e.g., impinge against, shear off from) a downstream corner between the aperture sidewall 76 and the wall surface 56. Deflecting the gas flow using the respective flow deflector 78 may thereby attenuate (e.g., reduce or eliminate) self-sustained flow oscillations at the respective aperture opening 72 where a dominant vortex mode locks onto a mode of the takeoff fitting 36. By contrast, without the flow deflector 78, the gas may flow into the aperture opening 72 and/or impinge against the aperture downstream corner generating flow instabilities. Such flow instabilities may excite one or more modes in the takeoff fitting 36 causing vibrations and/or sound (e.g., noise) via, for example, self-sustained flow oscillation—resonance. As an analogy, consider a whistling sound generated by directing an airflow across an opening of an empty bottle.

Figure 5:
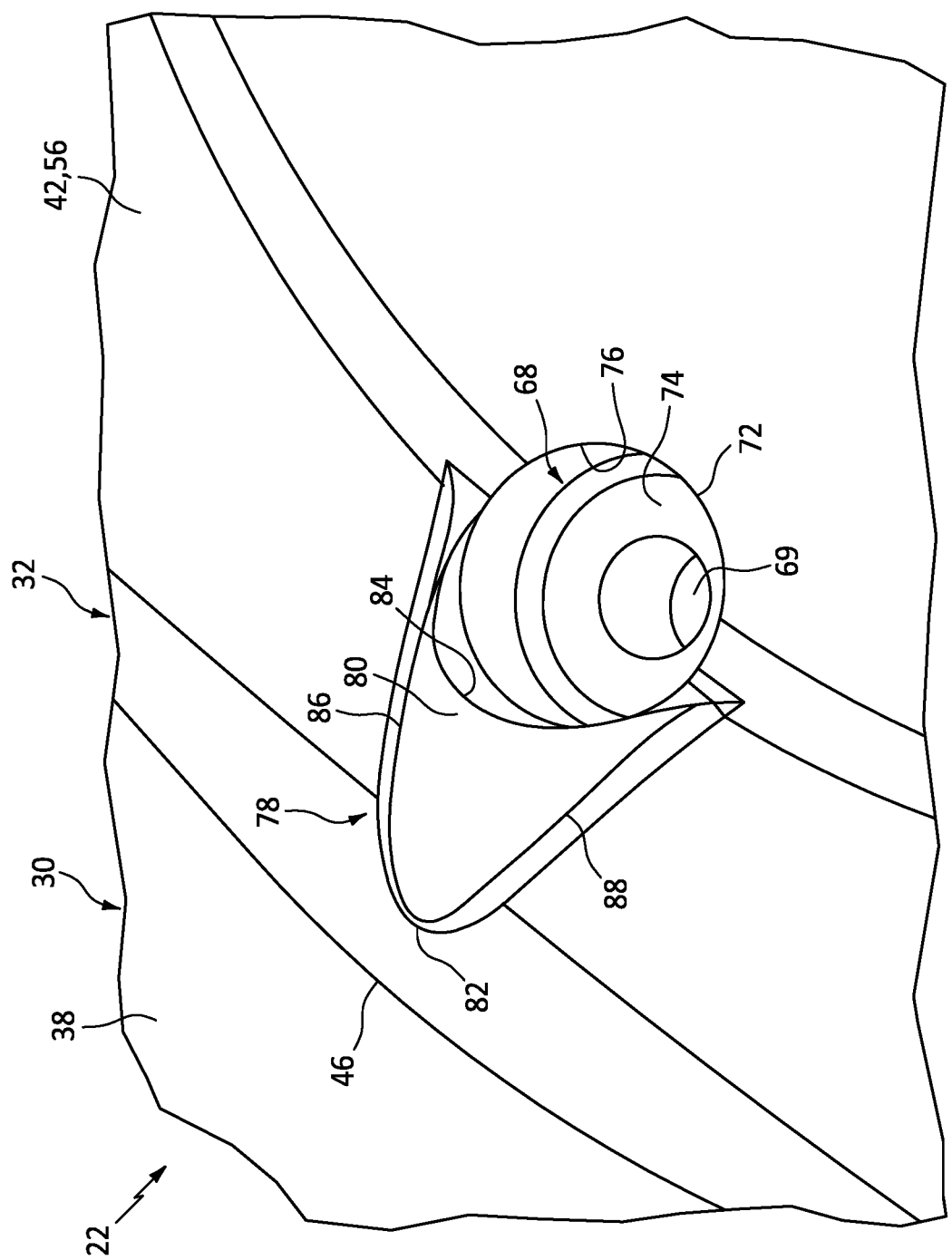
FIG. 5 is a partial perspective illustration of the engine structure at the flow deflector.

Referring to FIG. 3, each flow deflector 78 is disposed upstream of and may be adjacent the respective fastener aperture 68 and its aperture opening 72. Each flow deflector 78 projects vertically out from the second flowpath wall 32 at its wall surface 56, into the engine flowpath 26, to a distal end 80 (e.g., a peak) of the respective flow deflector 78. Referring to FIG. 5, each flow deflector 78 extends longitudinally (e.g., in an axial direction along the axial centerline 28 of FIG. 3, or angled to the axial direction) between and to a leading edge 82 of the respective flow deflector 78 and a trailing edge 84 of the respective flow deflector 78. Each flow deflector 78 extends laterally (e.g., in a circumferential direction about the axial centerline 28 of FIG. 4, or angled to the circumferential direction) between and to a first side 86 of the respective flow deflector 78 and a second side 88 of the respective flow deflector 78.

The deflector trailing edge 84 may extend laterally along (e.g., wrap partially around) an upstream edge (e.g., corner portion) of the respective aperture opening 72. The deflector trailing edge 84 of FIG. 5, for example, has a curved (e.g., partially circular, arcuate, etc.) geometry which follows (e.g., matches) a curved geometry of the upstream edge of the respective aperture opening 72. The flow deflector 78 of FIG. 5 may thereby form an extension of the aperture sidewall 76 at the deflector trailing edge 84. The present disclosure, however, is not limited to such an exemplary arrangement. For example, in other embodiments, it is contemplated the flow deflector 78 may be slightly spaced from the respective aperture opening 72.

Referring to FIG. 3, each flow deflector 78 has a longitudinal deflector length 90 measured between the deflector leading edge 82 and the deflector trailing edge 84. This deflector length 90 may be different (e.g., larger or smaller) than or alternatively equal to a longitudinal length 92 (e.g., a diameter) of the respective aperture opening 72. Referring to FIG. 4, each flow deflector 78 has a lateral deflector width 94 measured between the deflector first side 86 and the deflector second side 88. This deflector width 94 may be different (e.g., larger) than or alternatively equal to a lateral width 96 (e.g., the diameter) of the respective aperture opening 72. Each flow deflector 78 has a vertical deflector height 98 measured between the wall surface 56 and the deflector distal end 80. This deflector height 98 may be different (e.g., larger or smaller) than or alternatively equal to a vertical height 100 (e.g., depth) of the respective fastener aperture 68 measured between the aperture endwall 74 and the wall surface 56. In some embodiments, a ratio between the deflector width 94 and the deflector height 98 may be between one (1) and five (5). The present disclosure, however, is not limited to such an exemplary dimensional relationship.

Referring to FIG. 5, each flow deflector 78 may be configured as a ramp or another type of tapered protrusion. Each flow deflector 78, for example, may vertically taper to the wall surface 56 as that flow deflector 78 extends longitudinally from the deflector trailing edge 84 (or another location between the edges) to the deflector leading edge 82. Each flow deflector 78 may also or alternatively vertically taper to the wall surface 56 as that flow deflector 78 extends: laterally from an intermediate peak of the flow deflector 78 to the deflector first side 86; and/or laterally from the intermediate peak of the flow deflector 78 to the deflector second side 88.

Referring again to FIG. 1, the fluid system 24 includes the takeoff conduit 34, a flow regulator 102 (e.g., a valve) and at least one component 104 of the gas turbine engine. Examples of the engine component 104 include, but are not limited to, a heat exchanger (e.g., a precooler) for the gas turbine engine, an active clearance control (ACC) system for the gas turbine engine, a pneumatic actuator, or any other component of the gas turbine engine which may utilize gas flow (e.g., air flow) bled from the engine flowpath 26 during gas turbine engine operation. The fluid system 24 of FIG. 1 is configured to selectively takeoff (e.g., bleed) gas flowing through the engine flowpath 26 and deliver that takeoff gas (e.g., bleed air) to the engine component 104.

The flow regulator 102 is fluidly coupled with and (e.g., inline) between the takeoff conduit 34 and its conduit passage 62 and the engine component 104. The flow regulator 102 is configured to regulate a flow of the takeoff gas directed (e.g., bled) out of the engine flowpath 26 through the takeoff port 58 and directed to the engine component 104. During a first mode of operation, the flow regulator 102 may close and thereby fluidly decouple the conduit passage 62 from the engine component 104. During a second mode of operation, the flow regulator 102 may open and thereby fluidly couple the conduit passage 62 with the engine component 104.

The fastener apertures 68, the aperture openings 72 and the flow deflectors 78 of FIGS. 2-5 are described above as being configured with the takeoff fitting 36 and its second flowpath wall 32. It is contemplated, however, one or more groups of these elements 68, 72 and 78 may also or alternatively be configured with the first flowpath wall 30 or any other component of the gas turbine engine which at least partially forms a wall for the engine flowpath 26. The present disclosure therefore is not limited to takeoff fitting applications.

Figure 6:
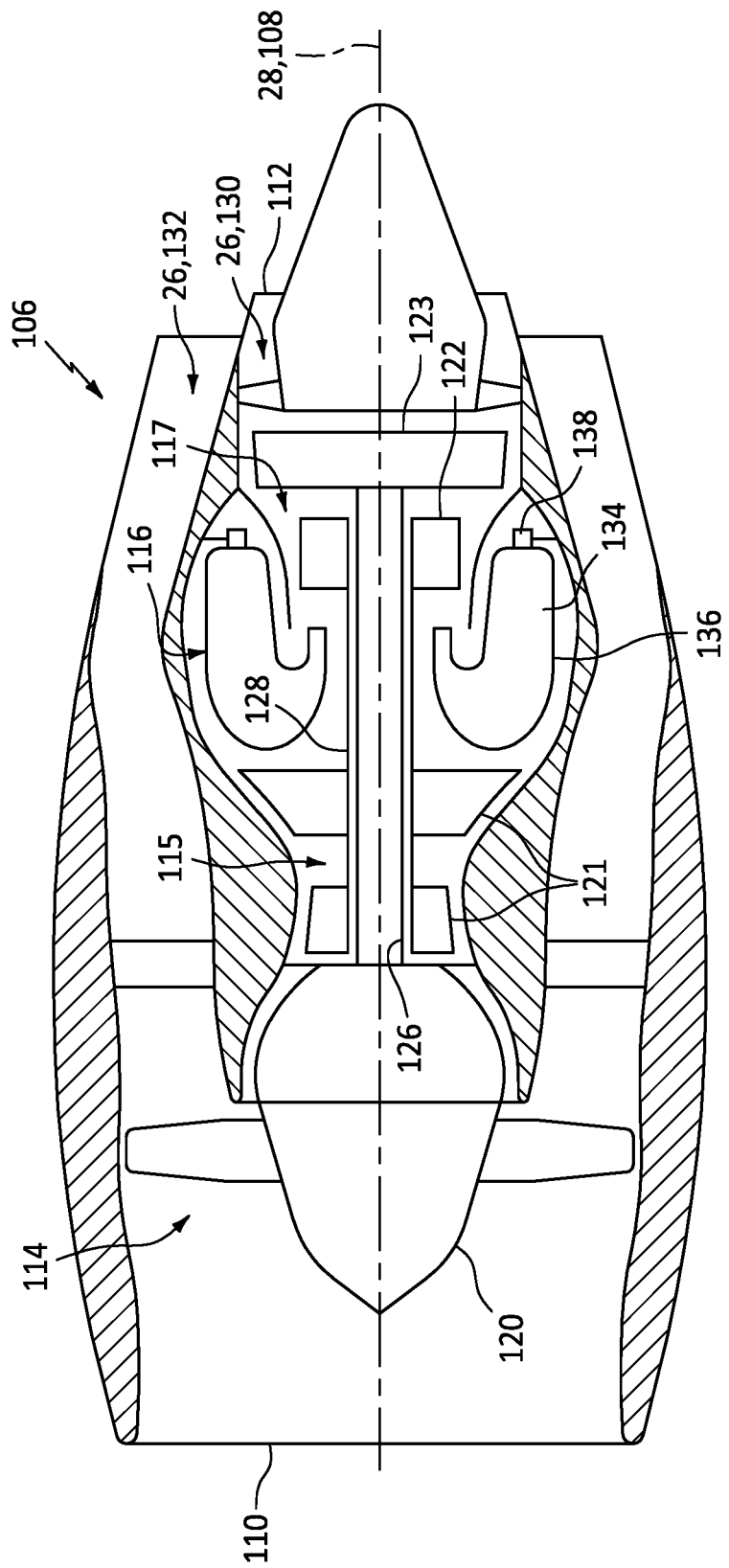
FIG. 6 is a sectional schematic illustration of a gas turbine engine.

FIG. 6 illustrates an example of the gas turbine engine which may include the engine system 20 described above. This gas turbine engine of FIG. 6 is configured as a turbofan gas turbine engine 106. The gas turbine engine 106 of FIG. 6 extends along an axial centerline 108 of the gas turbine engine 106 between an upstream airflow inlet 110 and a downstream airflow exhaust 112, which axial centerline 108 may be parallel with (e.g., coaxial with) the axial centerline 28. The gas turbine engine 106 includes a fan section 114, a compressor section 115, a combustor section 116 and a turbine section 117.

The fan section 114 includes a fan rotor 120. The compressor section 115 includes a compressor rotor 121. The turbine section 117 includes a high pressure turbine (HPT) rotor 122 and a low pressure turbine (LPT) rotor 123, where the LPT rotor 123 is configured as a power turbine rotor. Each of these rotors 120-123 includes a plurality of rotor blades arranged circumferentially around and connected to one or more respective rotor disks.

The fan rotor 120 is connected to the LPT rotor 123 through a low speed shaft 126. The compressor rotor 121 is connected to the HPT rotor 122 through a high speed shaft 128. The low speed shaft 126 extends through a bore of the high speed shaft 128 between the fan rotor 120 and the LPT rotor 123.

During operation, air enters the gas turbine engine 106 through the airflow inlet 110. This air is directed through the fan section 114 and into a core flowpath 130 and a bypass flowpath 132, where either the core flowpath 130 or the bypass flowpath 132 may be or otherwise include the engine flowpath 26. The core flowpath 130 extends sequentially through the engine sections 115-117; e.g., a core of the gas turbine engine 106. The air within the core flowpath 130 may be referred to as "core air". The bypass flowpath 132 extends through a bypass duct, which bypasses the engine core. The air within the bypass flowpath 132 may be referred to as "bypass air".

The core air is compressed by the compressor rotor 121 and directed into a (e.g., annular) combustion chamber 134 of a (e.g., annular) combustor 136 in the combustor section 116. Fuel is injected into the combustion chamber 134 via one or more of the fuel injectors 138 and mixed with the compressed core air to provide a fuel-air mixture. This fuel-air mixture is ignited and combustion products thereof flow through and sequentially cause the HPT rotor 122 and the LPT rotor 123 to rotate. The rotation of the HPT rotor 122 drives rotation of the compressor rotor 121 and, thus, compression of air received from an inlet into the core flowpath 130. The rotation of the LPT rotor 123 drives rotation of the fan rotor 120, which propels bypass air through and out of the bypass flowpath 132. The propulsion of the bypass air may account for a significant portion (e.g., a majority) of thrust generated by the turbine engine.

The engine system 20 may be configured with various gas turbine engines other than the one described above. The engine system 20, for example, may be configured with a geared gas turbine engine where a geartrain connects one or more shafts to one or more rotors in a fan section, a compressor section and/or any other engine section. Alternatively, the engine system 20 may be configured with a gas turbine engine configured without a geartrain. The engine system 20 may be configured with a geared or non-geared gas turbine engine configured with a single spool, with two spools (e.g., see FIG. 6), or with more than two spools. The gas turbine engine may be configured as a turbofan gas turbine engine, a turbojet gas turbine engine, a turboprop gas turbine engine, a turboshaft gas turbine engine or any other type of aircraft propulsion system gas turbine engine. The gas turbine engine, however, is not limited to propulsion system nor aircraft applications as described above.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for a gas turbine engine, comprising:
a flowpath wall comprising a surface and an opening to a blind aperture, the surface forming a peripheral boundary of an internal engine flowpath, the opening disposed in the surface, the opening having a lateral opening width, and the blind aperture extending vertically into the flowpath wall from the opening; and
a deflector projecting vertically out from the flowpath wall into the internal engine flowpath, the deflector configured to deflect gas flowing within the internal engine flowpath over the opening, the deflector having a lateral deflector width which extends laterally from a first side of the deflector to a second side of the deflector, the lateral deflector width equal to or greater than the lateral opening width, the deflector vertically tapering to the surface as the deflector extends laterally from a peak of the deflector to the first side of the deflector, and the deflector vertically tapering to the surface as the deflector extends laterally from the peak of the deflector to the second side of the deflector.

2. The system of claim 1, wherein the deflector is disposed upstream of the opening.

3. The system of claim 1, wherein the deflector is disposed adjacent the opening.

4. The system of claim 1, wherein the deflector extends laterally along an upstream edge of the opening.

5. The system of claim 1, wherein a ratio between the lateral deflector width and a vertical height of the deflector at the peak of the deflector is between 1 and 5.

6. The system of claim 1, wherein the deflector comprises a ramp.

7. The system of claim 1, wherein
the deflector extends longitudinally between a leading edge and a trailing edge; and
the deflector vertically tapers to the surface as the deflector extends longitudinally from the peak of the deflector to the leading edge.

8. The system of claim 7, wherein the trailing edge has a curved geometry.

9. The system of claim 1, further comprising:
a fastener comprising a head; and
the head disposed within the blind aperture.

10. The system of claim 9, wherein the head is recessed vertically into the blind aperture from the surface.

11. The system of claim 1, further comprising:
a second deflector;
the flowpath wall further comprising a second opening to a second blind aperture, the second opening disposed in the surface, and the second blind aperture extending vertically into the flowpath wall from the second opening; and
the second deflector projecting vertically out from the flowpath wall into the internal engine flowpath, the second deflector configured to deflect the gas flowing within the internal engine flowpath over the second opening.

12. The system of claim 1, further comprising:
a fitting comprising the flowpath wall and a takeoff conduit;
the flowpath wall further comprising a takeoff port downstream of the opening; and
the takeoff conduit projecting vertically out from the flowpath wall, and the takeoff conduit comprising a takeoff passage fluidly coupled with the internal engine flowpath through the takeoff port.

13. The system of claim 1, further comprising:
a gas turbine engine core;
the internal engine flowpath comprising one of
a bypass flowpath that bypass the gas turbine engine core; or
a core flowpath that extends within the gas turbine engine core.

* * * * *